United States Patent [19]

Villyard

[11] 4,278,424
[45] Jul. 14, 1981

[54] SOCKET HEAT FUSION APPARATUS

[76] Inventor: Charles S. Villyard, 8 NW. 8th St., Oklahoma City, Okla. 73102

[21] Appl. No.: 95,246

[22] Filed: Nov. 19, 1979

[51] Int. Cl.³ ............................ F24J 3/00; F27D 5/00
[52] U.S. Cl. ................................... 432/224; 432/10; 432/225
[58] Field of Search ............... 432/225, 226, 227, 10, 432/247, 224; 126/226

[56] References Cited
U.S. PATENT DOCUMENTS

| 3,389,896 | 6/1968 | Wilcox et al. | 432/10 |
| 3,879,252 | 4/1975 | Vossen | 432/224 |
| 4,014,640 | 3/1977 | Emery et al. | 432/225 |
| 4,203,721 | 5/1980 | Hayes et al. | 432/10 |

Primary Examiner—John J. Camby
Attorney, Agent, or Firm—Dunlap, Codding & McCarthy

[57] ABSTRACT

A socket heat fusion apparatus is provided for simultaneously heating one end portion of a thermoplastic conduit and one end portion of a thermoplastic coupler so that the heated end portion of the thermoplastic conduit can be disposed in the heated end portion of the thermoplastic coupler to provide a substantially fluid-tight union therebetween. The apparatus comprises a body member having a first heat communication opening and a second heat communication opening, the second heat communication opening extending through the body member and openly communicating with the first heat communication opening; a first receptacle disposed on one side of the body member for receiving one end portion of the thermoplastic conduit, the first receptacle communicating with the second heat communication opening; and, a second receptacle disposed on a second side of the body member for receiving one end portion of a thermoplastic coupler, the second receptacle openly communicating with the second heat communication opening.

17 Claims, 8 Drawing Figures

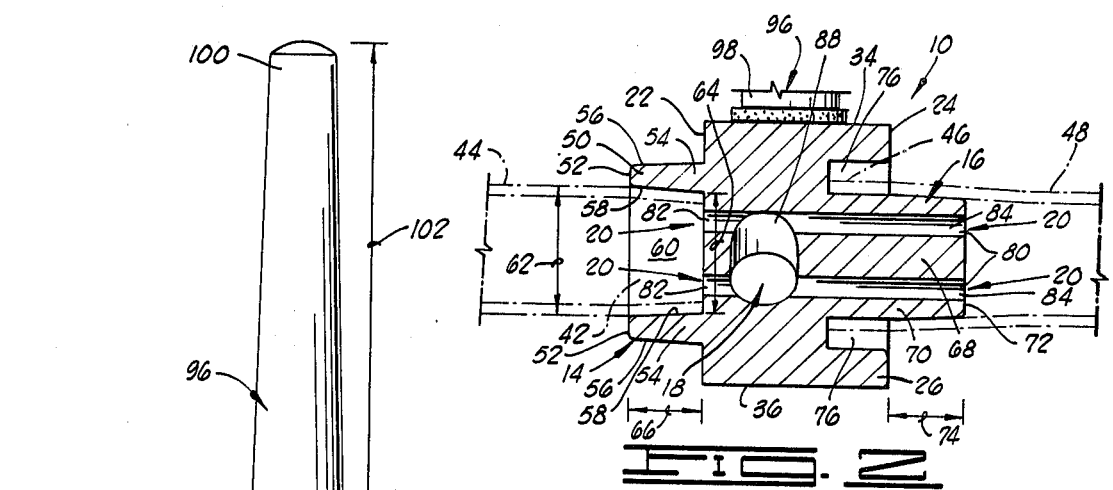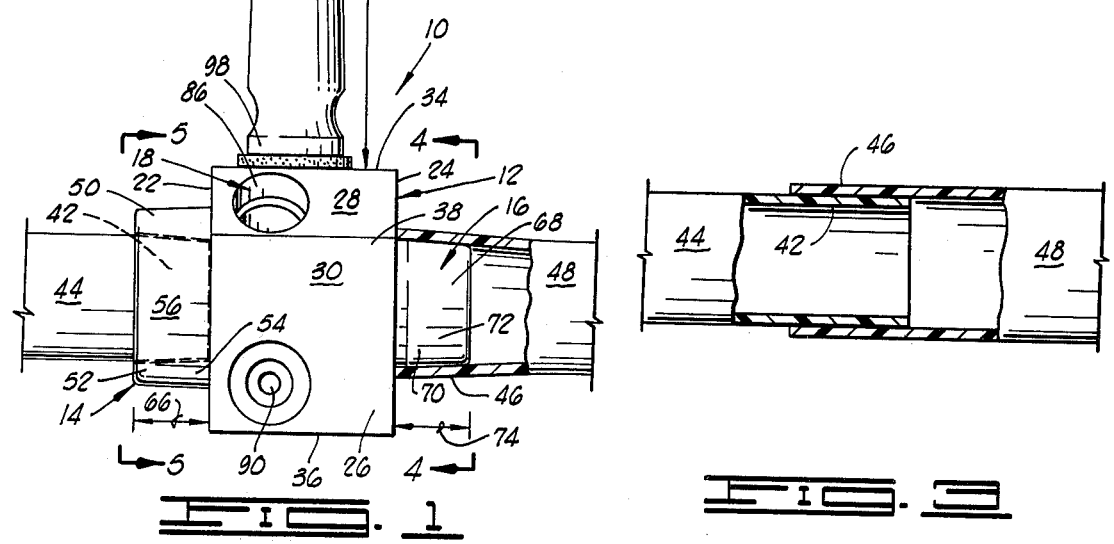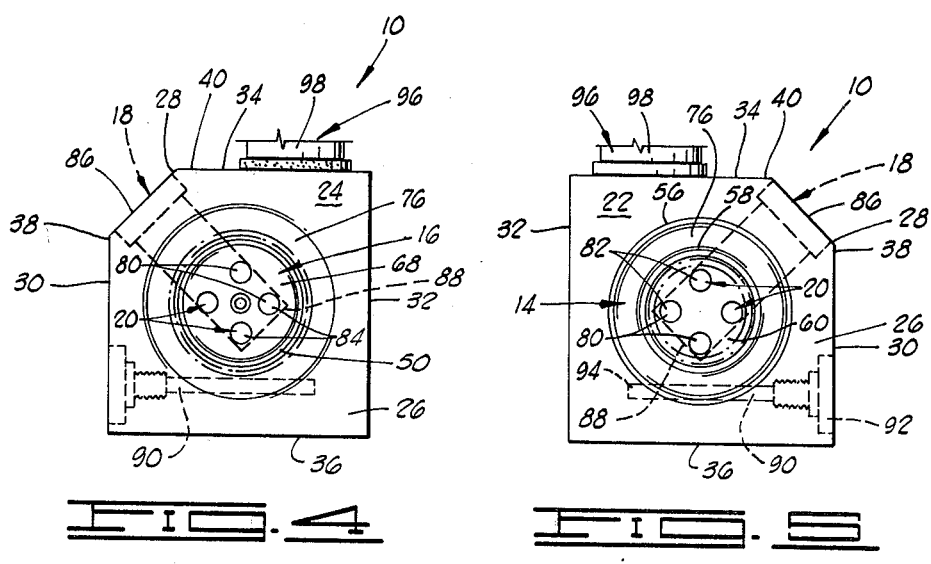

U.S. Patent Jul. 14, 1981 Sheet 2 of 2 4,278,424
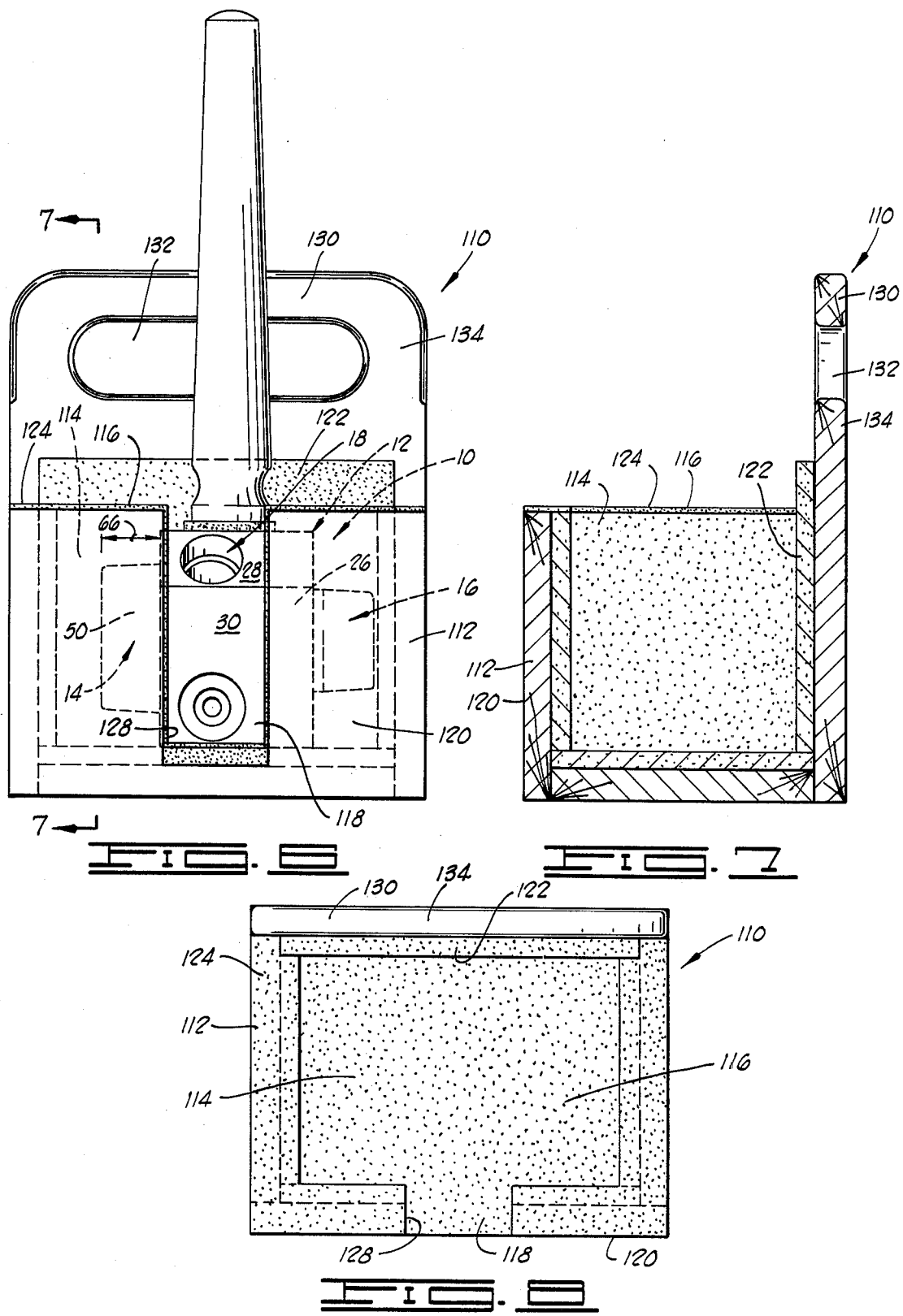

SOCKET HEAT FUSION APPARATUS

BACKGROUND OF THE INVENTION

1. Field of the Invention

The present invention relates generally to the field of heat fusion implements and more particularly, but not by way of limitation, to an improved socket heat fusion apparatus for simultaneously heating one end portion of the thermoplastic conduit and one end portion of a thermoplastic coupler so that the heated end portions can be joined together in a substantially fluid-tight relationship.

2. Discussion of the Prior Art

The use of thermoplastic conduits has found great acceptance in the modern world, such as in the use of thermoplastic conduits in oil field applications. Typically, the thermoplastic conduits are employed in large segments. However, under normal situations, the thermoplastic conduits must be joined to another segment of a thermoplastic conduit via a coupler or to a plurality of thermoplastic conduits via a coupler such as a T-shaped coupler.

Numerous methods have heretofore been proposed for joining thermoplastic conduits to couplers to provide a fluid-tight union therebetween. Typical of such methods has been the use of adhesives or the application of heat to render the thermoplastic conduit and the coupler in a softened, plastic state so that the thermoplastic conduit and the coupler could be readily joined together. However, problems have been encountered when attempting to join the thermoplastic conduit to the coupler in that failure of the system often occurs where the union between the thermoplastic conduit and the coupler is made. Further, problems have been encountered when attempting to join the thermoplastic conduit to the coupler via heat because the temperature to which the thermoplastic conduit and the coupler are heated to the softened, plastic state has not been readily controllable. Thus, a need has long existed for an improved apparatus which will enable one to controllably and effectively heat one end portion of the plastic conduit and one end portion of a coupler so that the two can be joined together to form a substantially fluid-tight union.

SUMMARY OF THE INVENTION

The present invention relates to an improved apparatus for simultaneously heating one end portion of a thermoplastic conduit and one end portion of a thermoplastic coupler so that the heated end portion of the thermoplastic conduit can be disposed within the heated and portion of the coupler to provide a substantially fluid-tight union therebetween. The apparatus of the invention broadly comprises a body member adapted to operatively engage a heat source, the body member having a first heat communication opening, a second heat communication opening, a first receptacle disposed on one side of the body member, and a second receptacle disposed on another side of the body member. The first heat communication opening, which is adapted to receive heat from a heat source, openly communicates with the second heat communication opening. The second heat communication opening extends between the one side of the body member having the first receptacle disposed thereon and the other side of the body member having the second receptacle disposed thereon such that the second heat communication opening openly communicates with the first receptacle and the second receptacle of the body member. The first heat communication opening intersects the second heat communication opening such that heat can be dispensed to the first receptacle and the second receptacle via the first and second heat communication openings.

Accordingly, it is an object of the present invention to provide an improved apparatus for coupling a thermoplastic conduit to a thermoplastic coupler.

Another object of the present invention is to provide an improved apparatus for the fusion bonding of a thermoplastic conduit to a thermoplastic coupler to form a substantially fluid-tight union therebetween.

Another object of the present invention is to provide an improved apparatus for fusion bonding a thermoplastic conduit to a thermoplastic coupler which is economical to manufacture and durable in construction.

Other objects, advantages and features of the present invention will become apparent to those skilled in the art from the reading of the following detailed description when read in conjunction with the accompanying drawings and the appended claims.

BRIEF DESCRIPTION OF THE DRAWINGS

FIG. 1 is an elevational view of the socket heat fusion apparatus of the present invention having a thermoplastic conduit and a thermoplastic coupler (the coupler being shown partially in cross-section) operatively connected to the apparatus.

FIG. 2 is a partially broken, sectional view of the socket heat fusion apparatus of the present invention depicting the first and second heat communication openings and showing, in phantom, one end portion of a thermoplastic conduit operatively engaging the first receptacle of the apparatus and one end portion of a thermoplastic coupler operatively engaging the second receptacle of the apparatus.

FIG. 3 is a partially broken, partially sectional view of one end portion of a thermoplastic conduit disposed within one end portion of a thermoplastic coupler to provide a substantially fluid-tight union therebetween as formed using the apparatus of the present invention.

FIG. 4 is a side view of the socket heat fusion apparatus of the present invention taken along the lines 4—4 of FIG. 1.

FIG. 5 is a side view of the socket heat fusion apparatus of the present invention taken along the lines 5—5 of FIG. 1.

FIG. 6 is a front elevational view of the retaining assembly for storing the socket heat fusion apparatus of the present invention depicting the socket heat fusion apparatus disposed therein.

FIG. 7 is a cross sectional view of the retaining assembly of FIG. 6, taken along the line 7—7 having the socket heat fusion apparatus removed therefrom.

FIG. 8 is a top plan view of the retaining assembly of FIG. 6 having the socket heat fusion apparatus removed therefrom.

DETAILED DESCRIPTION OF THE INVENTION

Referring to the drawings in which like numerals are used to depict like parts in the various views, and more particularly to FIGS. 1, 2, 4 and 5, shown therein and designated by the general reference numeral 10 is a socket heat fusion apparatus constructed in accordance with the present invention. The socket heat fusion apparatus 10 comprises a body member 12, a first receptacle 14, a second receptacle 16, a first heat communication opening 18, and a second heat communication opening 20. The first receptacle 14 is disposed on a first side 22 of the body member 12; and, the second receptacle 16 is disposed on a second side 24 of the body member 12. The second heat communication opening 20 is disposed within the body member 12 such that the second heat communication opening 20 extends through the body member 12 and communicates with the first receptacle 14 and with the second receptacle 16 (as depicted in FIG. 2). The first heat communication opening 18 is disposed within the body member 12 such that the first heat communication opening 18 intersects the second heat communication opening 20 and establishes fluid communication therebetween. Further, the first heat communication opening 18 is adapted to receive heat from a heat source, such as a propane torch (not shown). Thus, upon supplying heat to the first heat communication opening 18, heat can be directed to the first receptacle 14 and the second receptacle 16 of the socket heat fusion apparatus 10 via the first and second heat communication openings 18, 20, respectively.

The body member 12 of the socket heat fusion apparatus 10 is depicted as a rectangular parallelepiped 26 having one chamfered edge portion 28. The rectangular parallelepiped 26 is provided with the first side 22, the second side 24 (e.g., the opposed second side), a front side 30, an opposed back side 32, an upper side 34, and an opposed lower side 36. The chamfered edge portion 28 of the rectangular parallelepiped 26 extends from the first side 22 to the second side 24 and between an upper end portion 38 of the front side 30 and a forward end portion 40 of the upper side 34 substantially as shown in FIGS. 1, 4 and 5.

As previously stated, the first receptacle 14 is disposed on the first side 22 of the body member 12 (e.g., of the first side 22 of the rectangular parallelepiped 26). The first receptacle 14, which is in fluid communication with the first heat communication opening 18 via the second heat communication opening 20 is adapted to receive one end portion 42 of a thermoplastic conduit 44 as will be described more fully hereinafter. The second receptacle 16 is disposed on the side 24 of the body member 12 (e.g., the second side 24 of the rectangular parallelepiped 26). The second receptacle 16, which also is in fluid communication with the first heat communication opening 18 via the second heat communication opening 20, is adapted to receive one end portion 46 of a thermoplastic coupler 48 as will also be described in more detail hereinafter.

The first receptacle 14 of the socket heat fusion apparatus 10 comprises a substantially cylindrical shaped housing 50. The cylindrical shaped housing 50 is provided with a first end portion 52, an opposed second end portion 54, an outer side wall 56 and an inner side wall 58. The inner side wall 58 of the substantially cylindrical shaped housing 50 forms a cavity 60. The cavity 60 is adapted to receive the one end portion 42 of the thermoplastic conduit 44. The inner side wall 58 of the cylindrical shaped housing 50 is tapered such that the diametric distance 62 between the inner side walls 58 at the first end portions 52 of the housing 50 is greater than the diametric distance 64 between the inner side walls 50 of the opposed second end portion 46 of the housing 42. The first end portion 52 of the cylindrical shaped housing 50 is positioned a distance 66 from the opposed second end portion 54 of the housing 50 (and thus the first side 22 of the body member 12) to provide the cavity 60 with a depth represented by the distance 66. The depth 66 of the cavity 60 can vary widely provided that the cavity 60 is provided with a depth sufficient to enable the cylindrical shaped housing 50 to encompass the one end portion 46 of the thermoplastic conduit 44 which is to be united with the one end portion 46 of the thermoplastic conduit 48 to form the fluid-tight union therebetween as depicted in FIG. 3.

The second receptacle 16 of the socket heat fusion apparatus 10 comprises a substantially cylindrical shaped projecting member 68. The substantially cylindrical shaped projecting member 68 is provided with a first end portion 70 and an opposed second end portion 72. The first end portion 70 of the projecting member 68 is disposed adjacent the opposed second side 24 of the body member 12 (e.g., the second side 24 of the rectangular parallelepiped 26) such that the opposed second end portion 72 of the projecting member 68 extends a distance 74 from the second side 24 of the body member 12. The substantially cylindrical shaped projecting member 68 is adapted to receive the one end portion 46 of the thermoplastic conduit 44 as depicted in FIGS. 1 and 2. Further, the substantially cylindrical shaped projecting member 68 is (as depicted in FIGS. 1 and 2) a substantially frusto-conical shaped member. The first end portion 70 of the projecting member 68 has a greater circumference than the opposed second end portion 72.

The second receptacle 16 further comprises a concentric cavity 76 disposed within the second side 24 of the body member 12, the concentric cavity 76 being disposed about the first end portion 70 of the substantially cylindrical shaped projecting member 68. The concentric cavity 76, in combination with the substantially cylindrical shaped projecting member 68 is adapted to receive the one end portion 46 of the thermoplastic coupler 48.

Referring now to FIGS. 2, 4 and 5, the second heat communication opening 20 comprises a plurality of passageways 80, two passageways 80 being depicted in FIG. 2 and four passageways 80 being depicted in FIGS. 4 and 5. Each of the passageways 80 are provided with a first end portion 82 and an opposed end portion 84. Each of the passageways 80 extends through the body member 12 (e.g., the rectangular parallelepiped 26) from the first side 22 through the second side 24 and the cylindrical shaped projecting member 68 (as shown in FIG. 2). Thus, the plurality of passageways 80 establish fluid communication between the cavity 60 of the cylindrical shaped housing 50 of the first receptacle 14 and the projecting member 68 of the second receptacle 16.

Referring again to FIGS. 1, 2, 4 and 5, the first heat communication opening 18 of the body member 12 is provided with a first end portion 86 and an opposed second end portion 88. The first heat communication opening 18 is disposed within the body member 12 so that the opposed second end portion 88 of the first heat communication opening 18 intersects the plurality of passageways 80 of the second heat communication opening 20. As illustrated in FIGS. 1, 4 and 5, the first end portion 86 of the first heat communication opening 18 extends through the chamfered edge portion 28 of the rectangular parallelepiped 26 such that the first heat communication opening 18 is angularly disposed within the rectangular parallelepiped 26 (e.g., the body member 12). Further, the first end portion 86 of the first heat communication opening 18 can be enlarged to facilitate the use of a heat source, such as a propane torch.

The socket heat fusion apparatus 10 is further provided with a temperature sensing opening 90 disposed within the body member 12 (e.g., the rectangular parallelepiped 26). The temperature sensing opening 90 is adapted to receive a temperature sensing element, such as a thermometer, a thermocoupler, or the like, for detecting the temperature within the body member 12 and thus the first receptacle 14 and the second receptacle 16 of the apparatus 10. By determining the temperature within the first receptacle 14 and the second receptacle 16 of the socket heat fusion apparatus 10 one can readily determine the temperature to which the one end portion 42 of the thermoplastic conduit 44 is heated when disposed within the first receptacle 16, and the temperature to which the one end portion 46 of the thermoplastic conduit 44 is heated when same is engaged with the second receptacle 16. The temperature sensing opening 90 is provided with a first end portion 92 and an opposed second end portion 94. The first end portion 92 of the temperature sensing opening 90 openly communicates via a side portion of the body member 12 (e.g., front side 30 of the rectangular parallelepiped 26) and the opposed second end portion 94 of the temperature sensing opening 90 terminates within the body member 12 (e.g., the rectangular parallelepiped 26) in close proximity to the opposed second end portion 88 of the first heat communication opening 18 and the location where the opposed second end portion 88 of the first heat communication opening 18 intersects the passageways 80 of the second heat communication opening 20.

The socket heat fusion apparatus 10 further comprises a handle 96. The handle 96 is provided with a first end portion 98 and an opposed second end portion 100. The first end portion 98 of the handle 96 is secured to the body member 12 such that the opposed second end portion 100 of the handle 96 extends a distance 102 from the body member 12. The handle 96 can be secured to the body member 12 at any suitable position which does not interfere with the operation and use of the first receptacle 14, the second receptacle 16, the first heat communication opening 18, or the temperature sensing opening 90. As depicted in FIGS. 1, 2, 4 and 5, the first end portion 98 of the handle 96 is secured to the rectangular parallelepiped 26 forming the body member 12 via the upper side 34 of the rectangular parallelepiped 26.

In order to retard substantial heat loss from the socket heat fusion apparatus 10 when the socket heat fusion apparatus 10 is not in use to heat the one end portion 42 of the thermoplastic conduit 44 and the one end portion 46 of the thermoplastic coupler 48 (such as when the two are being joined to form the fluid-tight union therebetween as depicted in FIG. 3, but the socket heat fusion apparatus 10 is to be shortly employed to prepare additional thermoplastic conduits 44 and thermoplastic couplers 48 for union therebetween) the heated socket heat fusion apparatus 10 can be positioned within a retaining assembly 110 (as depicted in FIGS. 6, 7 and 8) for storing the apparatus 10 and retarding heat loss in the apparatus 10. The retaining assembly 110 comprises a housing 112 having a chamber 114 formed therein. The housing 112 is further provided with a first opening 116 openly communicating with the chamber 114 such that the body member 12 of the socket heat fusion apparatus 10 can be positioned within the chamber 114 by passage of the body member 12 through the first opening 116 of the housing 112. The housing 112 of the retaining assembly 110 is further provided with a second opening 118 formed in one side, such as a front side 120. The second opening 118 of the housing 112 communicates with the chamber 114 and the first opening 116 of the housing 112 such that upon positioning the body member 12 of the socket heat fusion apparatus 10 in the chamber 114, the handle 96 of the socket heat fusion apparatus 10 can extend through the second opening 118 of the housing 112. Thus, the socket heat fusion apparatus 10 can be positioned within the chamber 114 of the housing 112 such that the handle 96 of the apparatus 10 extends through the second opening 118 of the housing 112, or the handle can extend upwardly through the first opening 116 of the housing 112 as depicted in FIG. 6.

Since the socket heat fusion apparatus 10 can be in a heated condition when positioned within the chamber 114 of the housing 112 of the retaining assembly 110, (or the socket heat fusion apparatus 10 can be heated via a heating source, such as a propane torch, while supported in the chamber 114 of the housing 112 of the retaining assembly 110) the housing 112 further comprising a substantially fire-resistant first liner 122 disposed within the housing 112 to substantially line the chamber 114 therein. A second liner 124, also a substantially fire-resistant liner, is disposed on an upper portion 126 of the housing 112. The upper portion 126 of the housing 112 defines the first opening 116 in the housing 112. A third liner 128, also a fire-resistant liner, is disposed within and around the portion of the front side 120 of the housing 112 defining the second opening 118 therein.

Since it is desirable that the retainer assembly be able to be readily moved from one location to another, both while the socket heat fusion apparatus 10 is in a stored position or when the socket heat fusion apparatus 10 is removed therefrom, a handle 130 is operatively disposed on the housing 112 of the retaining assembly 110. The housing 130 of the retaining assembly 110 can be formed via an opening 132 in an extended portion of a back side 134 of the housing 112 substantially as shown in FIGS. 6 and 7. However, other suitable handle assemblies could be attached to the housing 112 for transporting the retaining assembly 110.

OPERATION

In order to more fully describe the present invention, the operation of the socket heat fusion apparatus 10 will now be described. Heat, such as the flame of a propane torch, is directed into the first heat communication opening 18 of the body member 12. The heat derived from the heat source is transmitted to the first receptacle 14 and the second receptacle 16 of the socket heat fusion apparatus 10 via the first heat communication opening 18 and the second heat communication opening 20. Either during the heating step, or once the temperature of the first and second receptacles 14 and 16 of the socket heat fusion apparatus 10 have reached the desired temperature, (as indicated by a temperature sensing device positioned within the temperature sensing opening 90 of the body member 12) the one end portion 42 of the thermoplastic conduit 44 is operatively disposed in the first receptacle 14 and the one end portion 46 of the thermoplastic coupler 48 is positioned upon the second receptacle 16. Once it has been determined that the one end portion 42 of the thermoplastic conduit 44 and the one end portion 46 of the thermoplastic coupler 48 have been heated to a desired temperature to substantially soften same, the thermoplastic conduit 44 and the thermoplastic coupler 48 are removed from the socket heat fusion apparatus 10 and the heated one end portion 42 of the thermoplastic conduit 44 is positioned within the heated one end portion 46 of the thermoplastic conduit 48. Upon cooling, the one end portion 42 of the thermoplastic conduit 44 is bonded to the one end portion 46 of the thermoplastic coupler 48 to form a substantially fluid-tight union therebetween. It should be noted that when using the socket heat fusion apparatus 10 of the present invention to heat the one end portion 42 of the thermoplastic conduit 44 and the one end portion 46 of the thermoplastic coupler 48, and thereafter position the heated one end portion 42 of the thermoplastic conduit 44 within the heated one end portion 46 of the thermoplastic coupler 48, a union is formed therebetween which is generally at least as strong or stronger than the conduit 44 and/or the coupler 48.

The terms "thermoplastic conduit" and "thermoplastic couplers" as used herein are to be understood as conduits and couplers which are fabricated of synthetic resins and wherein the fabricated conduits and couplers may be softened by the application of heat and thereafter regain their original properties upon cooling. Typical of thermoplastic resins which can be employed to fabricate the thermoplastic conduits and thermoplastic couplers are polyvinyl resins, polystyrene resins, acylate resins, polyolefin resin, such as polyethlyene, polypropylene, and the like.

While the subject invention has been described in terms of certain embodiments, and illustrated by certain drawings, such are intended for illustrative purposes only and alternatives or equivalents may readily occur to those skilled in the art without departing from the spirit or scope of the invention as set forth in the appended claims.

What is claimed is:

1. An apparatus for simultaneous heating one end portion of a thermoplastic conduit and one end portion of a thermoplastic coupler utilizing a heat source such that the heated end portion of the thermoplastic conduit can be disposed in the heated end portion of the coupler and provide a substantially fluid-tight union therebetween, the apparatus comprising:

a body member having a first heat communication opening and a second heat communication opening, the first heat communication opening adapted to receive heat from the heat source, the second heat communication opening extending between one side of the body member and another side of the body member, the first heat communication opening intersecting the second heat communication opening such that fluid communication is established therebetween;

a first receptacle disposed on the one side of the body member, the first receptacle adapted to receive the one end portion of the thermoplastic conduit, the first receptacle opening communicating with the second heat communication opening; and a second receptacle disposed on the other side of the body member, the second receptacle adapted to receive the one end portion of the second thermoplastic coupler, the second receptacle opening communicating with the second heat communication opening.

2. The apparatus of claim 1 wherein the first receptacle comprises a substantially cylindrical shaped housing, the housing have a first end portion, an opposed second end portion, an outer sidewall and an inner sidewall, the opposed second end portion of the housing being disposed adjacent the one side of the body member such that the first end portion of the housing extends a distance from the body member, the housing being adapted to receive the one end portion of the thermoplastic conduit.

3. The apparatus of claim 2 wherein the second receptacle comprises a substantially cylindrical shaped projecting member having a first end portion and an opposed second end portion, the first end portion of the projecting member being disposed adjacent the other body member such that the opposed second end portion of the projecting member extends a distance from the body member, the projecting member being adapted such that the one end portion of the thermoplastic coupler is positionable upon the projecting member.

4. The apparatus of claim 3 wherein the body member is further provided with a concentric cavity disposed about the first end portion of the substantially cylindrical shaped projecting member, the concentric cavity being adapted to receive the one end portion of the thermoplastic coupler when a portion of the coupler is positioned upon the projecting member.

5. The apparatus of claim 4 wherein the second heat communication opening is further characterized as comprising a plurality of passageways, each of the passageways extending through the body member and the cylindrical shaped projecting member such that fluid communication is established therethrough.

6. The apparatus of claim 5 wherein the first heat communication opening intersects each of the passageways of the second heat communication opening.

7. The apparatus of claim 6 wherein the body member is further provided with a temperature sensing opening positioned in close proximity to the passageways forming the second heat communication opening, the temperature sensing opening adapted to receive a temperature sensing element for detecting the temperature of the one end portion of the thermoplastic conduit disposed within the cylindrical shaped housing of the first receptacle and the temperature of the one end portion of the thermoplastic coupler disposed on the cylindrical shaped projecting member of the second receptacle.

8. The apparatus of claim 7 which further comprises a handle, the handle having a first end portion and a second end portion, the first end portion of the handle being secured to the body member such that the opposed second end portion of the handle extends a distance from the body member.

9. The apparatus of claim 8 wherein the inner sidewall of the substantially cylindrical shaped housing of the first receptacle is tapered such that the diametric distance between the inner sidewalls at the first end portion of the housing is greater than the diametric distance between the inner sidewalls at the opposed second end portion.

10. The apparatus of claim 9 wherein the substantially cylindrical shaped projecting member is substantially frustoconical shaped member such that the circumference of the first end portion of the member is greater than the circumference of the opposed second end portion of the members.

11. The apparatus of claim 10 wherein the body member is a rectangular parallelepiped having one chamfered edge portion, the rectangular parallelepiped further characterized as having a first side, an opposed second side, a front side, an opposed back side, an upper side and an opposed lower side, the chamfered edge portion extending along the upper side and the front side of the rectangular parallelepiped from the first side to the opposed second side.

12. The apparatus of claim 11 wherein:

the substantially cylindrical shaped housing of the first receptacle is disposed on the first side of the rectangular parallelepiped;

the opposed second side of the rectangular parallelepiped contains the concentric cavity and the substantially cylindrical shaped projecting member is disposed within the concentric cavity;

the first end portion of the handle is secured to the upper side of the rectangular parallelepiped;

the temperature sensing opening is disposed on the front side of the rectangular parallelepiped; and, the first heat communication opening is disposed on the chamfered edge portion of the rectangular parallelepiped.

13. The apparatus of claim 12 which includes a retaining assembly for storing the apparatus and for retarding heat loss in the apparatus, the retaining assembly comprising:

a housing having a chamber formed therein, the housing further having a first opening communicating with the chamber such that the body member of the apparatus can be positioned within the chamber by passage of the body member through the first opening, the housing further having a second opening formed in one side, the second opening communicating with the chamber and the first opening such that upon positioning of the body member in the chamber the handle of the apparatus extends through the second opening.

14. The retaining assembly of claim 13 wherein the housing further comprises a substantially fire-resistant first liner, the first liner being disposed within the housing and lining the chamber.

15. The retainer assembly of claim 15 which further comprises a second liner, the second liner being disposed on an upper portion of the housing defining the first opening.

16. The retainer assembly of claim 15 which further comprises a third liner, the third liner being disposed within the second opening of the housing.

17. The retainer assembly of claim 16 which further comprises a handle operably disposed on the housing for allowing the housing to be readily transported.

* * * * *